Aug. 22, 1961  K. C. SCHLANSKER ET AL  2,997,643
REGULATED DIRECT CURRENT POWER SUPPLY
Filed Jan. 23, 1959
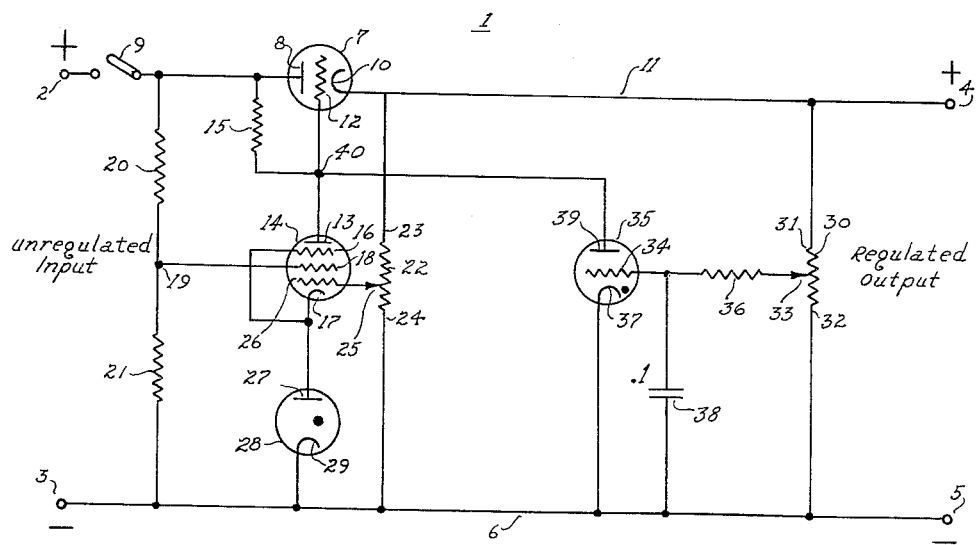
INVENTORS
K. C. Schlansker
Marion J. Langan
BY
Just & Cish
Attorneys United States Patent Office 2,997,643
Patented Aug. 22, 1961

2,997,643
REGULATED DIRECT CURRENT POWER SUPPLY
Kermit C. Schlansker, Fort Wayne, Ind., and Marion J. Langan, Elmhurst, Ill., assignors to International Telephone and Telegraph Corporation
Filed Jan. 23, 1959, Ser. No. 788,623
3 Claims. (Cl. 323—22)

This invention relates generally to direct current power supplies of the electronically regulated type, and more particularly to a regulated direct current power supply having overvoltage protection.

Electronically regulated direct current power supplies are well-known in the art, being shown, for example in Patent #2,474,269 to Martinez, assigned to the assignee of the present application. Such power supplies conventionally include a series-regulating valve and an amplifier coupled to control the regulating valve responsive to the output voltage across the output terminals of the power supply. While such regulated power supplies have normally provided eminently satisfactory operation, the removal or failure of the amplifier valve, or the neon voltage regulator tube usually associated therewith, removes the control signal from the regulating valve thus in turn permitting the output voltage to rise to an excessively high value. Heretofore, there has been no commonly accepted simple and inexpensive method of preventing the output voltage of a regulated direct current power supply of the type here under consideration from exceeding a selected value. Various relay-type devices have been proposed as a solution to the overvoltage problem, however, relays have certain inherent limitations, such as poor regulation under conditions of physical vibration and large physical size. Furthermore, the additional components, such as variable resistances, necessarily employed in conjunction with relay-type circuits, must in themselves be relatively large due to the inherent power requirements of such circuits.

It is therefore desirable to provide a regulated direct current power supply of the electronic type including simple means for protecting the circuit from overvoltage, it being further desirable that the overvoltage protection circuit be readily adaptable for use with any conventional electronically regulated direct current power supply.

Our invention therefore in its broader aspects provides a regulated direct current power supply having a pair of input terminals for connection to a source of unregulated direct current input voltage and a pair of output terminals for supplying a regulated direct current output voltage to a load. Variable impedance means are serially-connected between the respective input and output terminals for regulating the output voltage and means are provided for sensing at least one of the input and output voltages. Amplifier means are provided having a control element coupled to the voltage sensing means for providing a control signal responsive thereto, the amplifier means being coupled to the variable impedance means for varying the impedance thereof responsive to the control signal. Means are provided for sensing the output voltage and a thyratron is provided having a control grid coupled to the second voltage sensing means so that the thyratron fires responsive to a predetermined output voltage. The thyratron is coupled to the variable impedance means for increasing the impedance of the same responsive to firing of the thyratron so that the output voltage is prevented from rising above the predetermined voltage. In the preferred embodiment of our invention, the thyratron is of the cold-cathode type and an integrating circuit is coupled between the control grid of the thyratron and the output voltage sensing means so that the overvoltage protection circuit does not respond to short overvoltage surges.

It is accordingly an object of our invention to provide an improved regulated direct current power supply.

Another object of our invention is to provide an improved electronically regulated direct current power supply with means for preventing the output voltage from exceeding a predetermined level.

A further object of our invention is to provide an improved overvoltage protection circuit for use with an electronically regulated direct current power supply.

The above-mentioned and other features and objects of this invention and the manner of attaining them will become more apparent and the invention itself will be best understood by reference to the following description of an embodiment of the invention taken in conjunction with the accompanying drawing, wherein:

The single figure of the drawing schematically illustrates an electronically regulated direct current power supply incorporating our improved overvoltage protection circuit.

Referring now to the drawing, the improved direct current power supply of our invention, generally identified as 1, includes a pair of input terminals 2 and 3 adapted to be connected to an unregulated source of direct current input voltage (not shown), and a pair of output terminals 4 and 5 adapted to supply a regulated direct current output voltage to a load (not shown). It will be seen that input terminal 3 is directly connected to the output terminal 5 by a common connection 6 and that a valve, such as a triode-type tube 7, is serially-connected between the other input terminal 2 and the output terminal 4. Here, the plate 8 of the triode 7 is connected to the input terminal 2 by means of switch 9 and cathode 10 is connected to the output terminal 4 by connection 11. The control grid 12 of the series regulator tube 7 is directly connected to plate 13 of amplifier tube 14 with resistor 15 connecting plate 8 to control grid 12 of tube 7, as shown.

The amplifier tube 14 is shown as being of the pentode type having its suppressor grid 16 connected to its cathode 17, either internally or externally, in accordance with conventional practice, and having its screen grid 18 connected to midpoint 19 between serially-connected resistors 20 and 21 which are connected as a voltage divider across input terminals 2 and 3, as shown. It is thus seen that a voltage responsive to the unregulated input voltage is impressed upon the screen grid 18 of the amplifier tube 14. A suitable potentiometer 22 has its ends 23 and 24 respectively connected across conductors 11 and 6 and thus the output terminals 4 and 5, the sliding element 25 of potentiometer 22 being directly connected to control grid 26 of the amplifier tube 14. It will be seen that the voltage impressed upon the control grid 26 is responsive to the regulated output voltage across the output terminals 4 and 5.

The cathode 17 of the pentode amplifier 14 is connected to the anode 27 of a suitable neon tube 28 which in turn has its cathode 29 directly connected to the common conductor 6 between the input terminal 3 and output terminal 5; the neon tube 28 having a relatively fixed voltage drop between its cathode 29 and anode 27 after it is fired provides a relatively constant cathode potential for the amplifier 14.

It will be readily seen that a current drawn by the amplifier 14 through the resistor 15 is responsive to both the input and output voltages of the power supply and thus that a swing of the unregulated input voltage in one direction or the other and/or a swing in the regulated output voltage results in a change in the current flow through the resistor 15, thus providing the control signal applied to the control grid 12 of the regulator tube 7 in a direction to correct the output voltage across the output terminals 4 and 5. The circuit thus far described is essentially that shown in the aforesaid Martinez patent and it will readily be seen that failure or removal of either the amplifier tube 14 or the voltage regulator tube 28 will result in removal of the control signal from the control grid 12 of the series regulator tube 7, thus permitting the output voltage across output terminals 4 and 5 to reach excessive levels.

In order to prevent the output voltage across output terminals 4 and 5 from exceeding a predetermined desired voltage level, we provide a potentiometer 30 having its ends 31 and 32 respectively connected across conductors 11 and 6 and thus output terminals 4 and 5 and having its sliding element 33 connected to control grid 34 of a thyratron tube 35 by a series resistor 36. The cathode 37 of the thyratron 35 is connected to the common conductor 6 between input terminal 3 and output terminal 5 and the control grid 34 is likewise connected to the common conductor 6 by a capacitor 38. The anode 39 of the thyratron 35 is directly connected to the control grid 12 of the series regulator tube 7, as shown. It will be seen that the series resistor 36 and shunt capacitor 38 constitute an integrating circuit so that the thyratron 35 does not tend to fire responsive to transient voltage surges but only to a sustained voltage level as sensed by the potentiometer 30.

It will now be seen that adjustment of the sliding element 33 of potentiometer 30 will cause the thyratron 35, which is preferably of the cold-cathode type, to fire at a predetermined output voltage level across output terminals 4 and 5. When the thyratron 35 fires, a heavy current flow is drawn thereby through the resistor 15, thus substantially lowering the potential of point 40 to which control grid 12 of the series regulator tube 7 is connected, thus reducing substantially the output voltage across the output terminals 4 and 5. Since once the thyratron 35 is fired its conduction cannot be terminated without impressing another signal on its control grid 34 or breaking its anode circuit, switch 9 in series between input terminal 2 and plate 8 of the series regulator tube 7 must be opened; opening of switch 9 breaks the anode circuit of thyratron 35 so that its conduction ceases and subsequent reclosing of switch 9 will again initiate normal operation of the circuit, assuming that the condition which caused the overvoltage across the output terminals 4 and 5 has been eliminated. In an actual circuit constructed in accordance with this invention, the components had the following enumerated values:

| | |
|---|---|
| Input voltage range _____ volts__ | 150–250 |
| Tube 7 _____ | 6Y6 |
| Tube 14 _____ | 6AC7 |
| Tube 28 _____ | 5651 |
| Tube 35 _____ | K–P–96 |
| Resistor 15 _____ ohms__ | 470,000 |
| Resistor 20 _____ do____ | 10,000 |
| Resistor 21 _____ do____ | 20,000 |
| Potentiometer 30 _____ megohm__ | 1 |
| Resistor 36 _____ do____ | 22 |
| Capacitor 38 _____ micro-microfarads__ | 500 |

The cold-cathode thyratron employed in the above circuit is of the type which fires with a grid voltage of approximately 85 volts positive with respect to the cathode and it is seen that with the control grid 34 connected to the sliding element 33 of potentiometer 30, the grid voltage may be adjusted to fire the thyratron 35 at a selected level of output voltage. When the thyratron 35 fires, it reduces the grid voltage to approximately 75 volts positive with respect to the negative output of the supply and the output of the power supply is equal to 75 volts plus the bias on the series regulator tube 7, which in turn is dependent upon the power supply load and the characteristic curve of the series regulator tube. It will be readily seen that the improved overvoltage protection circuit of our invention will perform equally well regardless of the polarity of the power supply, i.e., while the power supply of the drawing is shown with the input terminals 2 and 3 and output terminals 4 and 5 respectively positive and negative, the circuit will function equally well with the polarities reversed in which event the thyratron 35 would be reversed with its anode 39 connected to the common conductor 6 and its cathode 37 connected to the grid 12 of the series regulator tube 7. The firing point of the particular cold-cathode thyratron employed is observed to be virtually independent of its anode potential within the range of 100 to 300 volts and the tube further appears to be unaffected by ambient light, thus permitting encapsulation of the entire circuit. The fact that this particular tube has a positive grid firing characteristic lends itself particularly to use in our invention.

It will be observed that our improved overvoltage protection circuit produces no detrimental effect on the basic power supply in which it is installed, the only loading effect being that of the potentiometer 30 across the regulated output. By the employement of a cold-cathode thyratron, no filament supply is required, and since the thyratron is not employed except when the output voltage exceeds a selected value, the life of the tube should be virtually equal to its shelf life.

It will now be seen that we have provided an improved regulated direct current power supply of the electronic type incorporating a simple overvoltage protection circuit, which, by preventing the output voltage of the power supply from exceeding a predetermined selected value provides protection against excessive voltage for the connected equipment and also for personnel. Furthermore, the basic power supply itself is protected against excessive output voltage since the wattage rating on the internal load resistors as well as the working voltage of filter capacitors which may be provided in the regulated output may be substantially reduced and it will be seen that with our improved circuit, failure or removal of any tube in the power supply will result in a reduction rather than an increase in the output voltage (failure or removal of the series regulator tube 7 inherently results in a reduction of the output voltage), whereas in prior electronically regulated direct current power supplies without our improved overvoltage protection feature, failure or removal of the amplifier tube or the voltage regulator tube could result in a rise in the output voltage of from 200% to 300% of the nominal value.

While we have described above the principles of our invention in connection with specific apparatus, it is to be clearly understood that this description is made only by way of example and not as a limitation to the scope of our invention.

What is claimed is:

1. A regulated direct current power supply comprising: a pair of input terminals for connection to a source of unregulated direct current input voltage; a pair of output terminals for supplying a regulated direct current output voltage to a load; first valve means having at least three elements, two of said first valve means elements being serially-connected between respective ones of said input and output terminals by non-resistive connections and the third of said first valve means elements being a control element whereby said output voltage is regulated; first means for sensing the voltage across at least one of said pairs of terminals; an amplifier including second valve means having at least three elements including control and output elements, said second valve means output element being coupled to said first valve means control element; said second valve means control element being coupled to said first voltage sensing means whereby said amplifier develops a control signal responsive thereto; means including a resistor coupling said second valve means output element to one of said two first valve means elements whereby said control signal is impressed on said first valve means control element thereby to regulate said output voltage; means including a potentiometer having its ends connected across said output terminals; and a thyratron having its control grid coupled to the sliding element on said potentiometer whereby said thyratron fires responsive to a predetermined output voltage across said output terminals, said thyratron having its anode coupled to said second valve means output element whereby firing of said thyratron increases the voltage drop across said resistor thereby causing said first valve means to reduce said output voltage across said output terminals whereby said output voltage is prevented from rising above said predetermined voltage.

2. The combination of claim 1 in which said thyratron grid is coupled to said potentiometer sliding element by an integrating circuit comprising a series resistor and a shunt capacitor.

3. The combination of claim 1 in which the other of said input and output terminals are directly connected and said thyratron is of the cold-cathode type with its cathode and anode serially connected between said directly connected other input and output terminals and said second valve means output element, said thyratron having its control grid coupled to said potentiometer sliding element by an integrating circuit comprising a resistor serially connecting said thyratron control grid and said sliding element and a capacitor connected between said thyratron control grid and said directly connected other input and output terminals.

References Cited in the file of this patent

UNITED STATES PATENTS

| | | |
|---|---|---|
| 2,474,269 | Martinez | June 28, 1949 |
| 2,697,811 | Deming | Dec. 21, 1954 |
| 2,832,900 | Ford | Apr. 29, 1958 |